United States Patent [19]

Miura et al.

[11] Patent Number: 5,094,993

[45] Date of Patent: Mar. 10, 1992

[54] HYDROTREATING CATALYSTS

[75] Inventors: Tadashi Miura; Ikuo Akizuki; Hiroshi Kaya; Shohei Okano; Takuji Itoh, all of Saitama, Japan

[73] Assignee: Tonen Corporation, Saitama, Japan

[21] Appl. No.: 591,357

[22] Filed: Oct. 1, 1990

Related U.S. Application Data

[63] Continuation-in-part of Ser. No. 366,072, Jun. 14, 1989, abandoned, which is a continuation of Ser. No. 109,919, Oct. 19, 1987, abandoned.

[51] Int. Cl.$^5$ ...................... B01J 21/12; B01J 23/85
[52] U.S. Cl. .................................. 502/255; 502/254; 502/258; 502/259; 502/260; 502/263

[58] Field of Search ............... 502/254, 255, 256, 257, 502/258, 259, 260, 261, 262, 314, 263

[56] References Cited

U.S. PATENT DOCUMENTS 4,134,856 1/1979 Itoh et al. ...................... 502/254 X

*Primary Examiner*—W. J. Shine
*Attorney, Agent, or Firm*—Henry E. Naylor

[57] ABSTRACT

Disclosed is a catalyst suitable for hydrotreating hydrocarbonaceous oils which catalyst is comprised of at least one hydrogenative-active metal component supported on a carrier material comprised of about 20 to 60 weight percent of amorphous silica-alumina and about 80 to 40 weight percent of crystalline alumina having an average crystallite size of 35 Å, or less.

6 Claims, 4 Drawing Sheets

HYDROTREATING CATALYSTS

RELATED APPLICATIONS

This is a continuation-in-part of Ser. No. 366,072, filed June 14, 1989, now abandoned, which is a continuation of Ser. No. 109,919 filed Oct. 19, 1987, now abandoned.

FIELD OF THE INVENTION

The present invention relates to catalyst compositions suitable for hydrotreating hydrocarbonaceous oils. The catalyst compositions are comprised of at least one hydrogenative-active metal on silica-alumina containing support and are prepared by use of a hydroxy-carboxylic acid as an aging agent.

BACKGROUND OF THE INVENTION

In the hydrodesulfurization of petroleum hydrocarbonaceous oils, cobalt-molybdenum or nickel-molybdenum hydrotreating catalysts comprising one or more metals selected from metals of Groups VIII and VI of the Periodic Table of the Elements supported on an alumina or silica-alumina carrier have been widely used.

It is highly desirable that such catalysts, and the preparation thereof, be such that a relatively large amount of cobalt-molybdenum or nickel-molybdenum particles are substantially homogeneously dispersed on a support material. The inventors hereof have found that when cobalt or nickel is deposited on a silica-alumina carrier by an ion exchange method in a first step, and molybdenum is deposited thereon in the second step, molybdenum as the main component can be supported on the carrier in a uniformly dispersed state to form a highly active catalyst.

The inventors have also found that catalytic activity for hydrodesulfurization can be further improved by controlling the pore distribution in the catalyst in a specified range. Both concepts are disclosed in U.S. Ser. No. 726,112, filed Apr. 23, 1985, which is incorporated herein by reference.

While such catalysts have met with various degrees of success, there is still a need in the art for further improvement, such as improving the catalysts' desulfurization and denitrogenation properties.

SUMMARY OF THE INVENTION

In accordance with the present invention, there is provided a hydrotreating catalyst having improved hydrodesulfurization and hydrodenitrogenation properties comprised of at least one hydrogenative-active metal component supported on a carrier composed of about 20 to 60 weight percent of amorphous silica-alumina and about 80 to 40 weight percent of crystalline alumina, wherein the crystallite size of the crystalline alumina is about 35 Å or less, which catalyst is prepared by a process in which a silica-alumina hydrogel is formed and aged with a hydroxy-carboxylic acid for an effective amount of time.

In a preferred embodiment of the present invention, the silica content of the amorphous silica-alumina is about 2 to 35 weight percent, more preferably about 5 to 20 weight percent, based on the carrier.

DETAILED DESCRIPTION OF THE INVENTION

The term "hydrotreating," as used herein, refers to a process wherein a hydrocarbonaceous oil is treated in the presence of hydrogen and a hydrogenative-active catalyst at elevated temperatures. Such processes include hydrorefining at both low and high severity conditions accompanied by a limited amount of cracking. Included are hydroisomerization, hydrodealkylation, and the like. Also included are hydrodesulfurization and hydrodenitrogenation, as well as hydrocracking a distillate and bottoms fraction obtained by atmospheric or vacuum distillation, and hydrofining of a kerosene distillate, gas oil distillate, wax and lubricating oil distillate.

The catalyst of the present invention is particularly suitable for the hydrodesulfurization of medium gravity distillates such as kerosene and gas oil distillates, heavy gravity distillates obtained by the vacuum distillation, bottom oils containing asphalt and mixtures thereof.

The inventors have found that the physical properties of the catalyst carrier greatly influence catalytic activity. More particularly, the inventors have found that the size of the alumina crystallites of the carrier of the present invention exerts a significant influence on the hydrodesulfurization and hydrodenitrogenation activites of the catalyst and, therefore, a high activity, a long life and a high activity-maintaining capability required of the catalyst can be obtained by controlling the alumina crystallite size.

Figure 1:
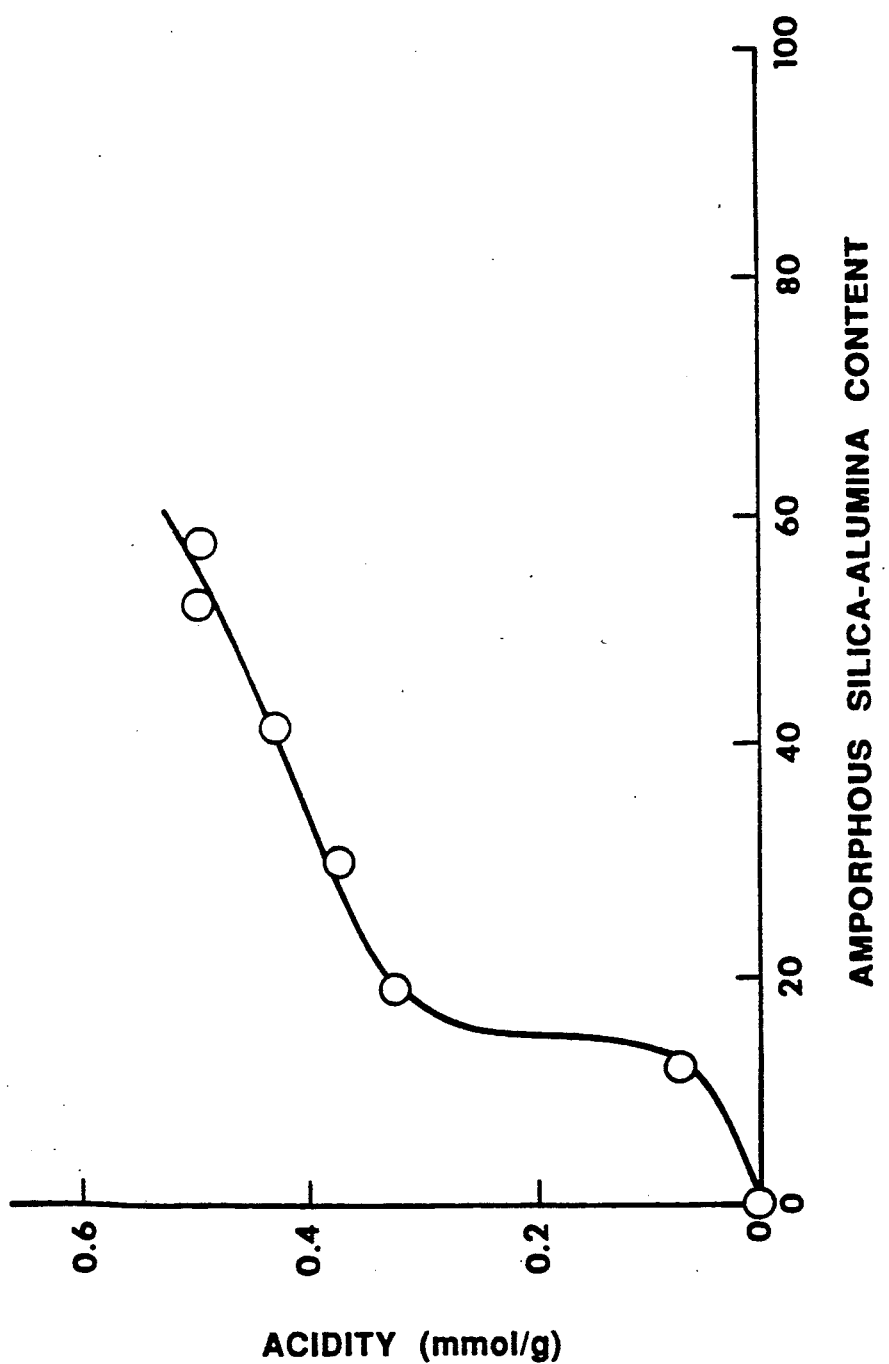
FIG. 1 is a graphical representation showing the relationship of amorphous silica-alumina content versus acidity.

It is important that the amorphous silica-alumina content be controlled in the range of about 20 to 60 weight percent as described above. As will be understood from FIG. 1, when the amount of the amorphous silica-alumina is less than about 20 weight percent, no sufficient acidity can be obtained and the reaction activity is reduced. Furthermore, when the amount of the amorphous silica-alumina exceeds 60 weight percent, the oil to be treated is cracked disadvantageously, though a sufficient acidity can be obtained.

The ratio of the crystalline alumina dispersed in the amorphous silica-alumina to the amorphous silica-alumina in the present invention exerts a significant influence on the amount of the hydrogenative-active metal component, particularly Group VI metal of the Periodic Table of the Elements, supported on the carrier. It is, therefore, critical for obtaining high catalytic activity that a carrier comprising about 20 to 60 weight percent of amorphous silica-alumina and about 80 to 40 weight percent of crystalline alumina, be used. The crystalline alumina of the carrier of the present invention can be analyzed by means of X-ray diffractometry. The silica content, in the form of the amorphous silica-alumina, is preferably in the range of about 2 to 35 weight percent, preferably about 5 to 20 weight percent, based on the total weight of the carrier. The desired acidity of the catalyst in hydrotreatments, particularly hydrodesulfurization and hydrodenitrogenation, is maintained by controlling the silica content of the carrier. When the silica content of the carrier is excessive, hydrogen consumption is increased or coke is formed unfavorably by an excessive cracking reaction in the course of hydrodesulfurization or hydrodenitrogenation. Thus, the silica content of the carrier in the form of the amorphous silica-alumina is limited to about 2 to 35 weight percent, preferably about 5 to 20 weight percent, based on the carrier.

Though the surface area or pore distribution of the silica-alumina carrier is not particularly limited, a preferred surface area is at 2/g, preferably at least about 200 least about 50 m²/g, preferably at least about 200 m²/g. The silica-alumina carrier can be produced by a process wherein alumina gel and silica gel which are previously prepared are mixed together. Also, a silica gel can be immersed in a solution of an aluminum compound and then a suitable amount of a basic substance can be added thereto to deposit alumina gel on the silica gel. Another suitable process is one in which a basic substance is added to a homogeneous solution of a mixture of a water-soluble aluminum compound and a water-soluble silicon compound to coprecipitate them.

A preferred process comprises adding a basic aluminum compound, such as sodium aluminate, and a basic silicon compound, such as water glass, to an aqueous solution of an acidic aluminum compound such as aluminum sulfate to obtain a mixture to which mineral acid, or an alkali hydroxide, is added to adjust the pH to 7 to 10, preferably 8 to 9, to form a silica-alumina hydrogel. Examples of the aging agent include hydroxycarboxylic acids and their salts, such as tartaric, citric and other hydroxy groups having polycarboxylic acids and alkali metal salts of thereof; aminodicarboxylic acids and their salts, such as glutamic and aspartic acids; and other amino groups containing polycarboxylic acids and alkali metal salts of them. More preferred are the hydroxy-carboxylic acids. These compounds can be added in an amount of 0.002 to 0.1 mol per mol of the aluminum compound.

The crystalline alumina in the carrier of the present invention thus prepared was analyzed by means of X-ray diffractometry and found to be substantially gamma-alumina.

The hydrotreating catalyst of the present invention is characterized in that the crystallite diameter of the crystalline alumina constituting the catalyst is about 35 Å or less. The crystallite diameter is determined from a half width of a peak around $2\Theta \approx 67°$ [d=1.40 (440)] according to the following Scherrer's equation using crystalline Si as the standard:

$$D_{hkl} = \frac{K\lambda}{\beta_{\frac{1}{2}} \cos \theta}$$

wherein:
DhKl represents the size (Å) of a crystallite with regard to the face (hKl), K represents a constant ($\approx 0.9$),
$\lambda$ represents the wavelength of incident X-rays (Cu-K$\alpha$ 1.5418 Å),
$\Theta$ represents an angle of diffraction (radian) and
$\beta_{\frac{1}{2}}$ represents a corrected half width (radian).

The performance of the catalyst of the present invention can be improved by controlling the composition and crystalline size of the silica-alumina carrier as described above for the following reasons:

(1) Since the crystalline alumina is highly and finely dispersed in the amorphous silica alumina phase in the carrier according to the present invention, a plurality of Group VIII and VIB metals of the Periodic Table of the Elements having different properties can be dispersed uniformly and supported on the carrier.

(2) The amorphous silica-alumina phase provides an ion exchange site effective in the uniform dispersion of Group VII metals on an atomic level.

(3) The crystalline alumina is an effective carrier for Group VIB metals. Further, by controlling the crystallite size, a state of coordination effective in improving the dispersion and activity, such as octahedral coordination in the case of molybdenum, can be easily obtained.

(4) The effects of the porous structures of the carriers on the catalysts are common in heterogeneous catalytic reactions. The pore distribution suitable for the hydrorefining reaction is realized by controlling the crystallite size, as in the present invention.

The hydrotreating catalyst of the present invention comprises at least one hydrogenation-active metal component supported on the above-mentioned carrier. The hydrogenation-active metal component can be deposited thereon by any of known processes. One non-limiting process is one wherein a Group VIII metal of the Periodic Table of the Elements is deposited by ion exchange method in the first step and then a Group VIB metal of the Periodic Table of the Elements is deposited in the second step is preferred.

More particularly, the hydrogenation-active metal component to be supported on the carrier in the first step in the present invention is one or more metals selected from the group consisting of Group VII metals of the Periodic Table of the Elements, such as iron, cobalt, nickel, palladium, platinum, osmium, iridium, ruthenium and rhodium. Preferred are cobalt and nickel.

The hydrogenation-active metal component to be supported on the carrier in the second step is one or more metals selected from Group VIB of the Periodic Table of the Elements, i.e., chromium, molybdenum and tungsten. Preferred are molybdenum and tungsten. If necessary, another metal can be added thereto.

The hydrogenation-active metal components of Groups VIII and VIB of the Periodic Table of the Elements are supported on a carrier, preferably in the form of their oxides and/or sulfides. The amount of the supported active metal of Group VIII is 0.5 to 20 weight percent, preferably 1 to 8 weight percent, more preferably 2 to 5 weight percent (in terms of the oxide), based on the catalyst, and that of the metal of Group VIB is 5 to 30 weight percent, preferably 8 to 25 weight percent, more preferably 15 to 20 weight percent.

When ion exchange is employed in the first step of preparing the catalysts of the present invention, a solution of an amine complex salt of the active metal is prepared and the silica alumina carrier is immersed in the solution to impregnate the metal on the carrier. The amount and concentration of the amine complex salt solution can be suitably controlled so that a desired amount of the metal will be impregnated on the carrier.

The carrier having the hydrogenation-active metal component supported thereon is taken out of the immersion solution, washed with water, dried and calcined.

The activity of the catalysts prepared by the present invention is not easily deteriorated and a high desulfurization rate can be obtained with the catalyst even under reaction conditions of a low severity, particularly under a low reaction pressure.

For hydrodesulfurization, the catalyst may be used in a fixed, fluidized, or moving bed system. Preferred is a fixed bed. Two or more reactors connected together may be used in hydrodesulfurization to attain a relatively high desulfurization rate. Further, the catalyst of the present invention can be packed in a guard reactor preceding a main reactor in which the hydrodesulfurization, or hydrodenitrogenation, reaction is carried out.

The catalyst of the present invention is preferably presulfided prior to use. The presulfiding can be effected in situ in the reactor. More particularly, the calcined catalyst is contacted with a sulfur-containing distillate at a temperature of about 150° to 400° C. under a pressure of about 20 to 100 kg/cm² (total pressure) at a liquid space velocity of about 0.3 to 2.0 V/H/V in the presence of about 50 to 1,500 l/l of a hydrogen-containing gas. After completion of the sulfiding treatment, the sulfur-containing distillate is replaced with a feed oil and the operation is started under conditions suitable for the desulfurization of the feed oil. The sulfiding processes include, in addition to the above-mentioned process, a process comprising directly contacting the catalyst with hydrogen sulfide or another sulfur compound and a process comprising adding hydrogen sulfide or another sulfur compound to a suitable distillate and contacting the mixture with the catalyst.

The following non-limiting examples will further illustrate the present invention.

EXAMPLES 1-6

0.02 mol, per mol of an aluminum sulfate, of ammonium tartrate was added to 8 weight percent (in terms of alumina) aqueous aluminum sulfate solution. Then 25 weight percent (in terms of alumina) of sodium aluminate and about 3 (Example 1), 7 (Example 2), 10 (Example 3), 15 (Example 4), 18 (Example 5), or 25 (Example 6) weight percent, based on the total amount of an alumina-silica, of water glass No. 3 (in terms of silica) were added thereto. The mixture was aged at 70° C. for 3 hours while the pH of the solution was kept between 8.8 to 9.0 by adding dropwise sodium hydroxide or nitric acid.

Figure 2:
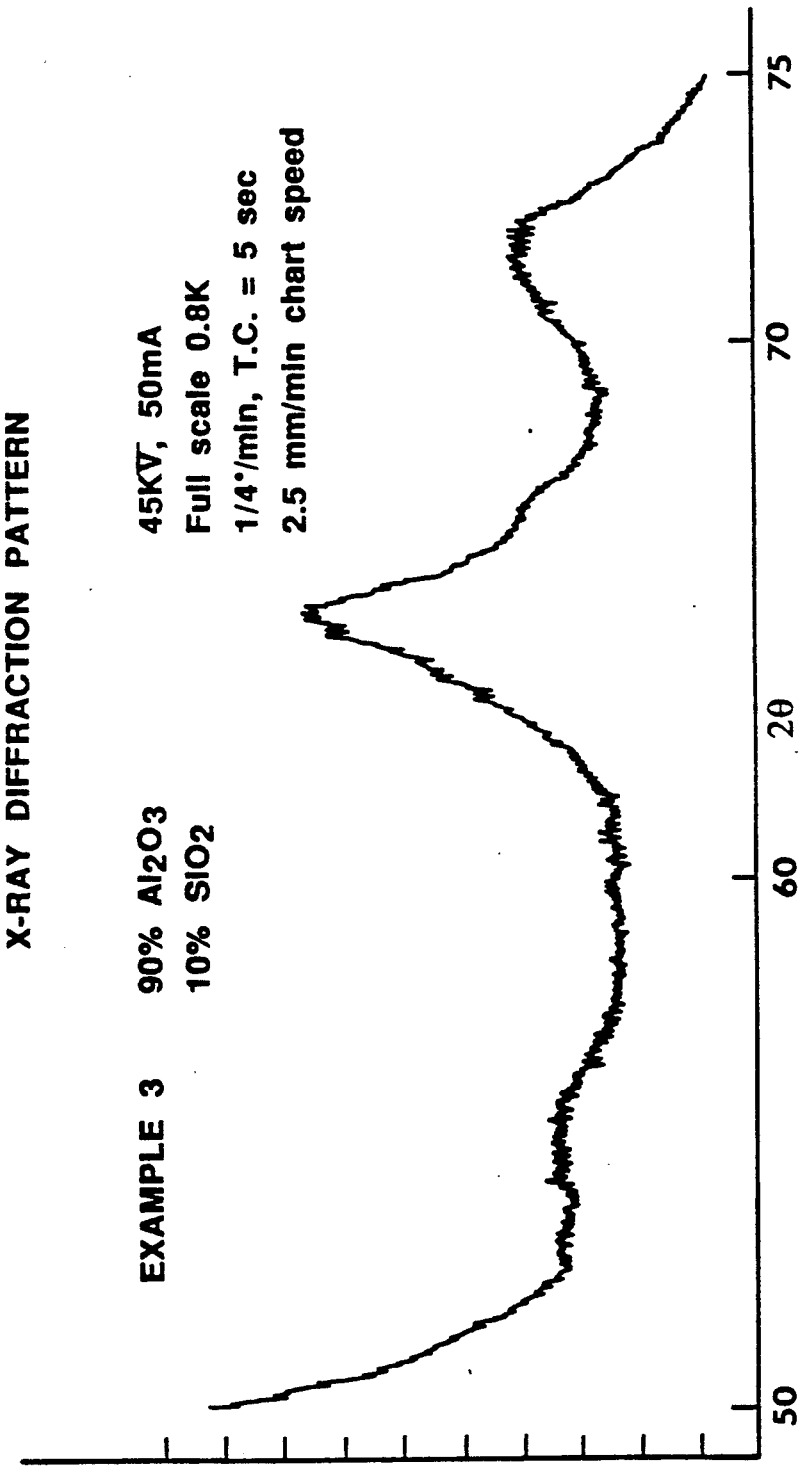
FIG. 2 is an X-ray diffraction pattern showing the alumina crystallite size of the carrier material of the present invention.

The alumina-silica hydrogel thus formed was filtered, washed with a 1.5 percent ammonium carbonate solution and dried with a spray dryer. The gel thus obtained was shaped into pellets having a diameter of 1.5 mm with an extruder. The pellets were dried and then calcined at 600° C. in an electric muffle furnace for 3 hours. The properties of the obtained carrier are shown in Table 1 below. FIG. 2 is an X-ray diffraction pattern of the product of Example 3, showing the crystallite size of the alumina.

COMPARATIVE EXAMPLE 1

Figure 3:
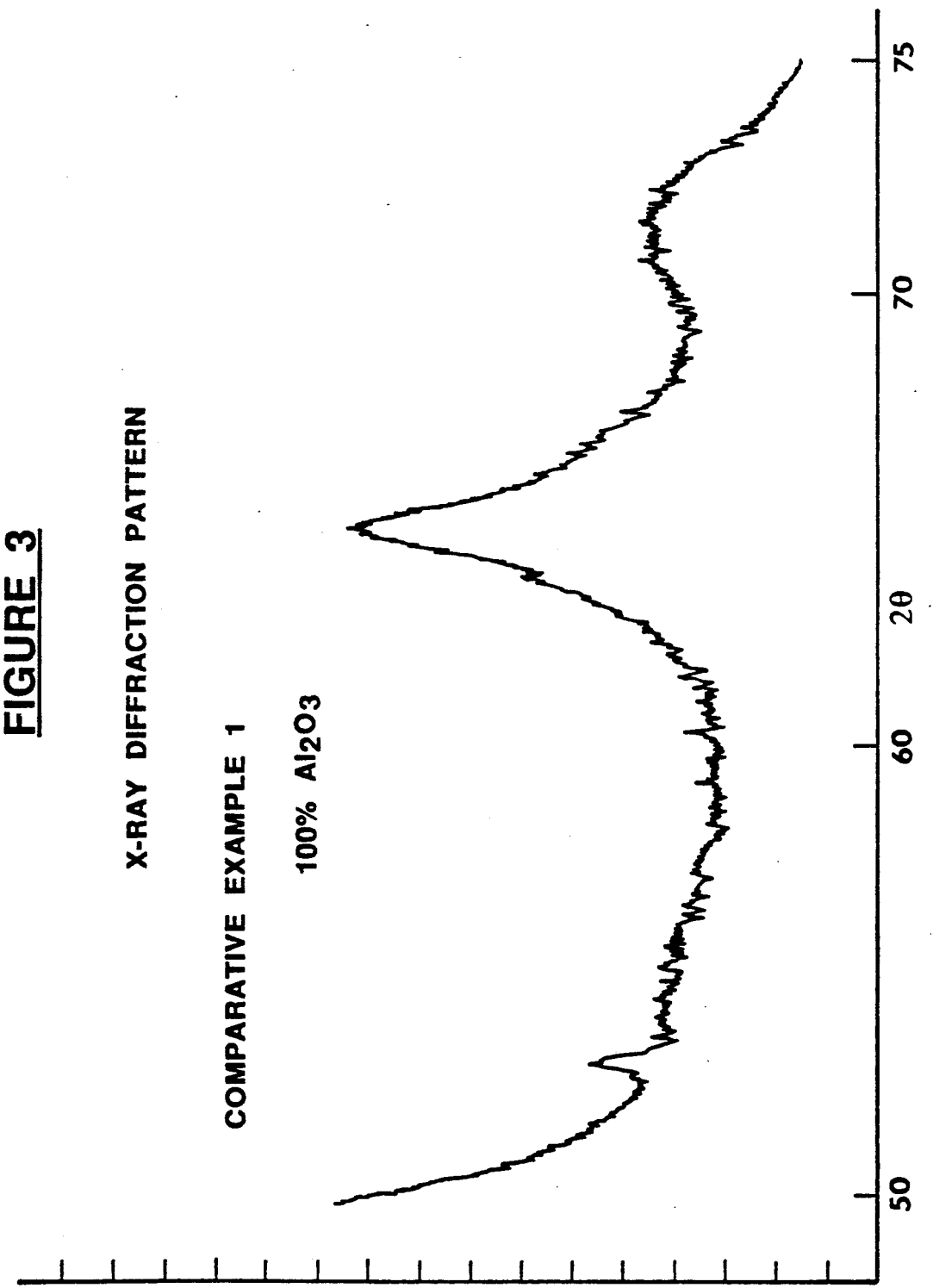
FIG. 3 is an X-ray diffraction pattern showing the alumina crystallite size of a conventional alumina carrier material.
Figure 4:
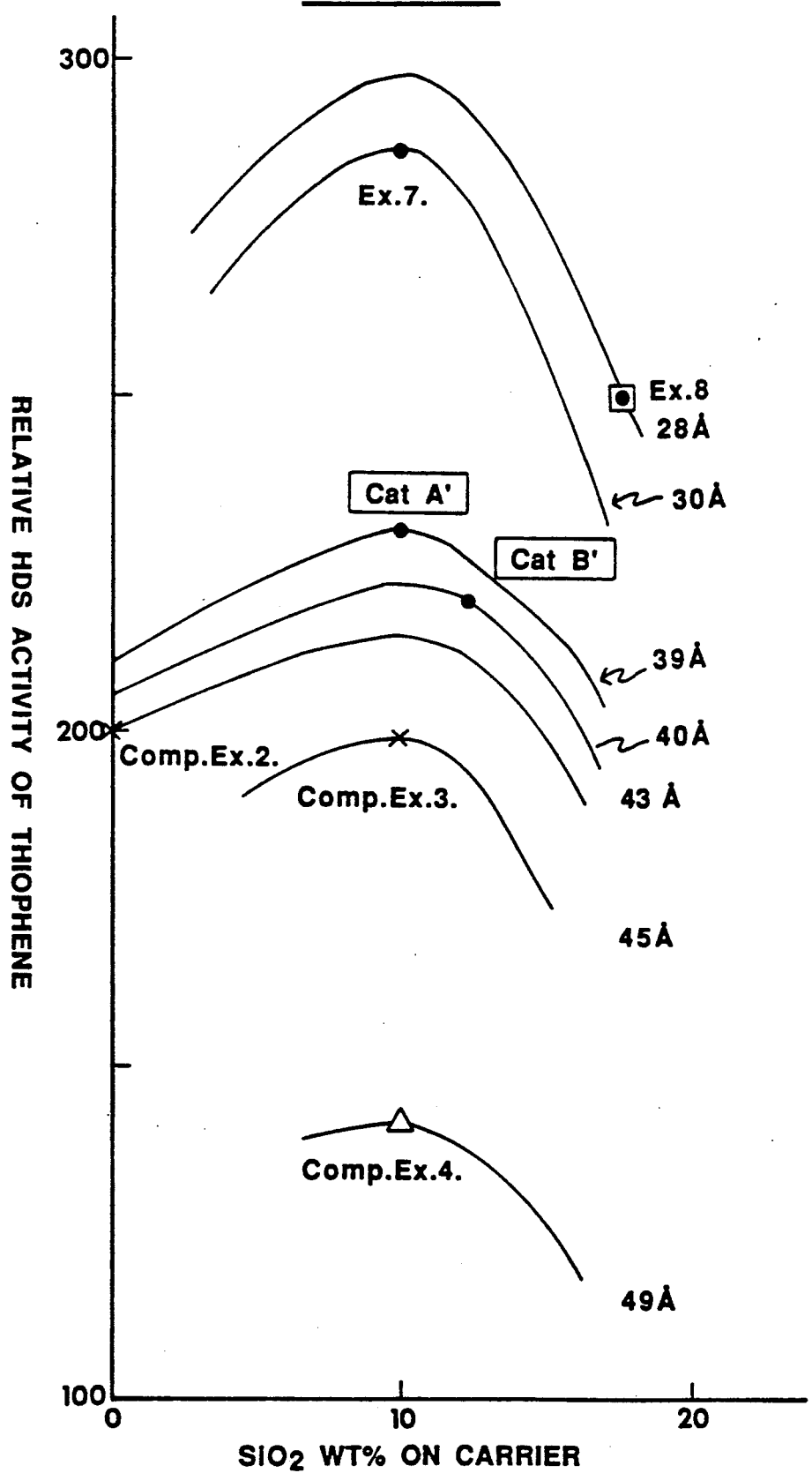
FIG. 4 is a plot of HDS activity for thiophene versus the silica content and crystallite size for the catalysts tested herein.

An alumina carrier was prepared in the same manner as in Examples 1 to 6 except that no water glass was added. The properties are shown in Table 1. FIG. 3 is an X-ray diffraction pattern of the product showing the crystallite diameter of the alumina carrier.

TABLE 1

| | $SiO_2$ (wt %) | $Na_2O$ (wt %) | $SO_4$ (wt %) | Surface Area (m²/g) | (Note 1) Crystallite Size of $Al_2O_3$ Å | (Note 2) Crystalline $Al_2O_3$ (%) |
|---|---|---|---|---|---|---|
| Comp. Ex. 1 | 0.0 | 0.0 | 0.05 | 226 | 43 | 100 |
| Example | | | | | | |
| 1 | 2.8 | 0.02 | 0.05 | 242 | 35 | 80 |
| 2 | 6.8 | 0.02 | 0.05 | 291 | 33 | 69 |
| 3 | 10.0 | 0.02 | 0.05 | 366 | 30 | 59 |
| 4 | 14.8 | 0.02 | 0.05 | 212 | 29 | 45 |
| 5 | 17.6 | 0.04 | 0.05 | 298 | 28 | 42 |
| 6 | 24.5 | 0.12 | 0.10 | 330 | 29 | 42 |

(Note 1) Determined according to the Scherrer's equation from the face (440) of the crystalline alumina by the X-ray diffractometry using a known Si crystal particle diameter as the standard (H. P. Klug "X-ray Diffraction Procedure," John Wiley & Sons, Inc., 1974).
(Note 2) Determined from the diffraction peak area of the face (440) of crystalline alumina assuming that the mass absorption coefficient of Al is equal to that of Si.

EXAMPLES 7 AND 8

15.6 g of cobalt nitrate was dissolved in 70 ml of distilled water. 80 ml of aqueous ammonia was added to the solution to obtain a cobalt amine complex salt solution. 50 g of the carrier obtained in Example 3 (Example 7) or the carrier obtained in Example 5 (Example 8) was immersed in the solution and left to stand overnight. The solution was drained and the carrier was dried with air and then calcined at 550° C. The carrier was then immersed in a solution of ammonium molybdate in 3N aqueous ammonia to impregnate molybdenum. After drying with air followed by calcining at 550° C., a catalyst was obtained.

COMPARATIVE EXAMPLE 2

A catalyst was prepared in the same manner as in Examples 7 and 8 except that the same carrier in Comparative Example 1 was used.

COMPARATIVE EXAMPLE 3

0.02 mol, per mol of aluminum sulfate, of ammonium tartate was added to an 8 weight percent (in terms of alumina) aqueous aluminum sulfate solution. Then 25 weight percent (in terms of alumina) of sodium aluminate and 10 weight percent, based on the total amount of alumina-silica, of water glass No. 3 (in terms of silica) were added thereto. The mixture was aged at 70° C. for 3 hours while the pH of the solution was kept at about 8.8 and 9.0 by adding dropwise sodium hydroxide or nitric acid.

The alumina-silica hydrogel thus formed was filtered, washed with a 1.5 weight percent ammonium carbonate solution and dried with a spray dryer. The gel thus obtained was shaped into pellets having a diameter of 1.5 mm with an extruder. The pellets were placed on a porcelain dish and calcined at 600° C. in an electric muffle furnace for 3 hours while steam was introduced thereunto through a stainless steel porous plate. The metals were impregnated on the carrier thus obtained to obtain a catalyst in the same manner as in Examples 7 and 8.

COMPARATIVE EXAMPLE 4

A 2 weight percent (in terms of alumina) aqueous aluminum sulfate solution was prepared and its pH was adjusted to 8.8 to 9.0 with an aqueous sodium hydroxide solution under stirring. The mixture was aged at 60° C.

for 2 hours. The formed alumina-hydrogel was filtered, washed with a 1.0 percent ammonium acetate solution and dried with a spray dryer. A commercial high-purity silica gel was added thereto in such an amount that the silica gel after firing would be 10 weight percent. The mixture was kneaded throughly with alumina gel in a kneader and the silica-alumina gel thus obtained was dried and calcined at 600° C. in an electric muffle furnace for 2 hours. The metals were impregnated on the carrier in the same manner as in Examples 7 and 8 to obtain a catalyst.

The properties of the catalysts obtained in Examples 7 and 8 and Comparative Examples 2, 3 and 4 and the activities of them determined according to a desulfurization reaction of thiophene are shown in Table 2.

COMPARATIVE EXAMPLE 5

0.02 mol, per mol of aluminum sulfate, of ammonia solution was added to an 8 weight percent (in terms of alumina) aqueous aluminum sulfate solution. Then 25 weight percent (in terms of alumina) of sodium aluminate and 10 weight percent, based on the total amount of alumina-silica, of water glass No. 3 (in terms of silica) were added thereto. The mixture was aged at 70° C. for 3 hours with ammonium tartrate while the pH of the solution was kept at about 8.8 to 9.0 by adding dropwise sodium hydroxide or nitric acid. The alumina-silica hydrogel thus formed was filtered, washed with a 1.5 weight percent ammonium carbonate solution and dried with a spray dryer. The gel thus obtained was shaped into pellets having a diameter of 1.5 mm with an extruder. The pellets were dried and then calcined at 600° C. in an electric muffle furnace for 3 hours.

The properties of the resulting carrier were as follows: $Na_2O = 0.03$ wt. %; $SiO_2 = 10$ wt. %; $SO_4 < 0.05$ wt. %; $Al_2O_3$ crystallite size = 39 Å; and $Al_2O_3$ crystallinity = 85%.

Cobalt and Molybdenum were deposited on the carrier in the same manner as in Examples 7 and 8 to obtain the resulting catalyst. The activity of this catalyst was determined according to a desulfurization reaction of thiophene as shown in Table 2 below.

COMPARATIVE EXAMPLE 6

A catalyst was prepared in accordance to the procedure of Example 3 hereof except that an aging agent (ammonium tartrate) was not used. That is, an 8 weight percent (in terms of alumina) aqueous aluminum sulfate solution was prepared. Then 25 weight percent (also in terms of alumina) of sodium aluminate and 10 weight percent, based on the total amount of alumina-silica, of water glass No. 3 (in terms of silica) were added thereto. The mixture was aged at 70° C. for 3 hours while the pH of the solution was kept at about 8.8 to 9.0 by adding dropwise sodium hydroxide or nitric acid. The alumina-silica hydrogel thus formed was filtered, washed with a 1.5 weight percent ammonium carbonate solution and dried with a spray dryer. The gel thus obtained was shaped into pellets having a diameter of 1.5 mm with an extruder. The pellets were placed on a porcelain dish and calcined at 600° C. in an electric muffle furnace for 3 hours.

The properties of the resulting carrier were as follows: $Na_2O = 0.02$ wt. %; $SiO_2 = 12.4$ wt. %; $SO_4 < 0.05$ wt. %; $Al_2O_3$ crystallite size = 40 Å; and $Al_2O_3$ crystallinity = 85%.

Cobalt and Molybdenum were deposited on the resulting carrier as in the same manner set forth in Example 7 hereof. The activity of the resulting catalyst was also determined according to a desulfurization reaction of thiophene as shown in Table 2 below.

TABLE 2

|  | Composition (wt %) (Note 1) | | | Crystallite Size of Alumina (Å) | (Note 2) Desulfurization Activity on Thiophene |
|---|---|---|---|---|---|
|  | $SiO_2$ | CoO | $MoO_3$ | | |
| Example 7 | 10.0 | 4.6 | 15.2 | 30 | 287 |
| Example 8 | 17.6 | 4.5 | 14.9 | 28 | 250 |
| Comp. Ex. 2 | 0.0 | 4.4 | 14.7 | 43 | 200 |
| Comp. Ex. 3 | 10.0 | 4.5 | 15.3 | 45 | 198 |
| Comp. Ex. 4 | 10.0 | 4.5 | 14.9 | 49 | 142 |
| Comp. Ex. 5 | 10.0 | 4.5 | 15.0 | 39 | 230 |
| Comp. Ex. 6 | 12.4 | 4.6 | 15.2 | 40 | 220 |

(Note 1) Wt % based on the carrier.
(Note 2) Starting materials: 5.0 wt % of thiophene, 2.0 wt % of pyridine and 93.9 wt % of n-hexane. Reaction Conditions: 300° C., 1.5 W/H/W, hydrogen/feed molar ratio: 6.0, presulfiding drying at 100° C. in a dry nitrogen stream for 2 hours followed by treatment in a gaseous mixture of 2.5% of $H_2S$ and 97.5% of $H_2$ at 300° C. for 1 hour.
The numerals are rate constants of the first-order reaction of thiophene.

What is claimed is:

1. A catalyst for hydrotreating hydrocarbonaceous oil, which catalyst is characterized as being comprised of at least one hydrogenation-active metal component supported on a carrier composed of about 20 to 60 weight percent of armophous silica-alumina and about 80 to 40 weight percent of crystalline alumina, the crystallite size of the crystalline alumina being about 35 Å or less, which catalyst is prepared by a process in which a silica-alumina hydrogel is formed and aged with a hydroxy-carboxylic acid or a salt thereof for an effective amount of time.

2. The catalyst of claim 1, wherein the crystallite size is 35 Å or less.

3. The catalyst of claim 1, wherein the amorphous silica-alumina contains about 2 to 35 weight percent of silica.

4. The catalyst of claim 2 wherein the amorphous silica-alumina contains about 2 to 35 weight percent of silica.

5. The catalyst of claim 1 where a salt of a hydroxycarboxylic acid is used and is selected from ammonium citrate, ammonium tartrate, and ammonium malate.

6. The catalyst of claim 4 where a salt of a hydroxycarboxylic acid is used and is selected from ammonium citrate, ammonium tartrate, and ammonium malate.

* * * * *